US011664848B2

(12) United States Patent
Werner et al.

(10) Patent No.: US 11,664,848 B2
(45) Date of Patent: May 30, 2023

(54) ADJUSTABLE ATTENUATION WRAP PLUG

(71) Applicant: INTERNATIONAL BUSINESS MACHINES CORPORATION, Armonk, NY (US)

(72) Inventors: John S. Werner, Fishkill, NY (US); Faezeh Gholami, Ridgewood, NJ (US); Noah Singer, White Plains, NY (US); John Torok, Poughkeepsie, NY (US); Philip A. Sciuto, Poughkeepsie, NY (US); Arkadiy O. Tsfasman, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 15/931,689

(22) Filed: May 14, 2020

(65) Prior Publication Data

US 2021/0359718 A1 Nov. 18, 2021

(51) Int. Cl.

| | |
|---|---|
| ***G02B 6/26*** | (2006.01) |
| ***G02B 6/38*** | (2006.01) |
| ***H04B 3/48*** | (2015.01) |

(52) U.S. Cl.

CPC ............... *H04B 3/48* (2013.01); *G02B 6/266* (2013.01); *G02B 6/3825* (2013.01); *G02B 6/3827* (2013.01); *G02B 6/3833* (2013.01)

(58) Field of Classification Search

CPC .... G02B 6/266; G02B 6/3825; G02B 6/3827; G02B 6/3833; H04B 3/48

See application file for complete search history.

(56) References Cited

U.S. PATENT DOCUMENTS

| | | | | |
|---|---|---|---|---|
| 4,952,798 A * | 8/1990 | Graham | G02B 6/387 | 356/73.1 |
| 4,979,793 A * | 12/1990 | Bowen | G02B 6/4246 | 250/227.16 |
| 4,982,083 A * | 1/1991 | Graham | G02B 6/2861 | 356/73.1 |
| 5,311,614 A * | 5/1994 | Caron | G02B 6/266 | 385/140 |
| 5,367,159 A | 11/1994 | Schofield | | |
| 5,475,781 A * | 12/1995 | Chang | G02B 6/3879 | 385/76 |

(Continued)

FOREIGN PATENT DOCUMENTS

JP 2005070185 A 3/2005

OTHER PUBLICATIONS

Amanu, "Macro bending losses in single mode step index fiber". Advances in Applied Sciences, International journal of scientific and technical research in engineering (IJSTRE) www.ijstre.com vol. 1 Issue 4 II Jul. 2016, 8 pages.

(Continued)

*Primary Examiner* — Ryan A Lepisto

(74) *Attorney, Agent, or Firm* — Tihon Poltavets

(57) ABSTRACT

An adjustable attenuation wrap plug for insertion into a signal port at an end product includes a housing with a protruding input prong and output prong, wherein a signal cable is coupled to the input prong and the output prong. The adjustable attenuation wrap plug further includes a ratchet mechanism at least partially disposed in the housing, wherein the ratchet mechanism is configurable to alter a shape of the signal cable.

14 Claims, 6 Drawing Sheets

(56) References Cited

U.S. PATENT DOCUMENTS

| | | | | |
|---|---|---|---|---|
| 5,930,417 | A * | 7/1999 | Wolfe | G02B 6/35 385/140 |
| 6,454,464 | B1 * | 9/2002 | Nolan | G02B 6/3846 385/60 |
| 6,707,979 | B2 * | 3/2004 | Wang | G02B 6/3827 385/140 |
| 7,065,284 | B2 * | 6/2006 | Ao | G02B 6/266 385/39 |
| 8,511,911 | B2 | 8/2013 | Ott | |
| 9,482,823 | B1 | 11/2016 | Li | |
| 9,847,130 | B1 | 12/2017 | Jo | |

OTHER PUBLICATIONS

Kunzia et al., "Built-in test capable fiber optic transceiver application concept", 2013 IEEE Avionics, Fiber-Optics and Photonics Technology Conference (AVFOP) (pp. 69-70).

Xiang et al., "High-speed serial optical link test bench using FPGA with embedded transceivers", https://www.researchgate.net/publication/228795762, Jan. 2009, pp. 1-6.

* cited by examiner

ADJUSTABLE ATTENUATION WRAP PLUG

FIELD OF THE INVENTION

This disclosure relates generally to wrap plugs, and in particular, to adjustable attenuation wrap plugs.

BACKGROUND OF THE INVENTION

A wrap plug (i.e., loopback plug) is commonly utilized to test fiber optic transceivers, where transmitted data (output) is looped back as received data (input) simulating a complete communications link utilizing a single device. The wrap plug is designed to provide a specific attenuation for signals that would have to travel a desired distance when implemented in an end product (e.g., server equipment). For testing a fiber optic link at the end product to ensure proper communication at multiple distances requires multiple wrap plugs of different attenuation levels, where a technician has to physically swap out the multiple wrap plugs of different attenuation levels.

SUMMARY

One aspect of an embodiment of the present invention discloses an apparatus for an adjustable attenuation wrap plug, the apparatus comprising a housing with a protruding input prong and output prong, wherein a signal cable is coupled to the input prong and the output prong. The apparatus further comprising a ratchet mechanism at least partially disposed in the housing, wherein the ratchet mechanism is configurable to alter a shape of the signal cable.

Another aspect of an embodiment of the present invention discloses an apparatus for an adjustable attenuation wrap plug, the apparatus comprising a housing with a protruding input prong and output prong at a first end, wherein a signal cable is coupled to the input prong and the output prong. The apparatus further comprising a cavity at a second end of the housing, wherein an attenuation adjustment block is insertable into the cavity and configured to alter a shape of the signal cable.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1A:
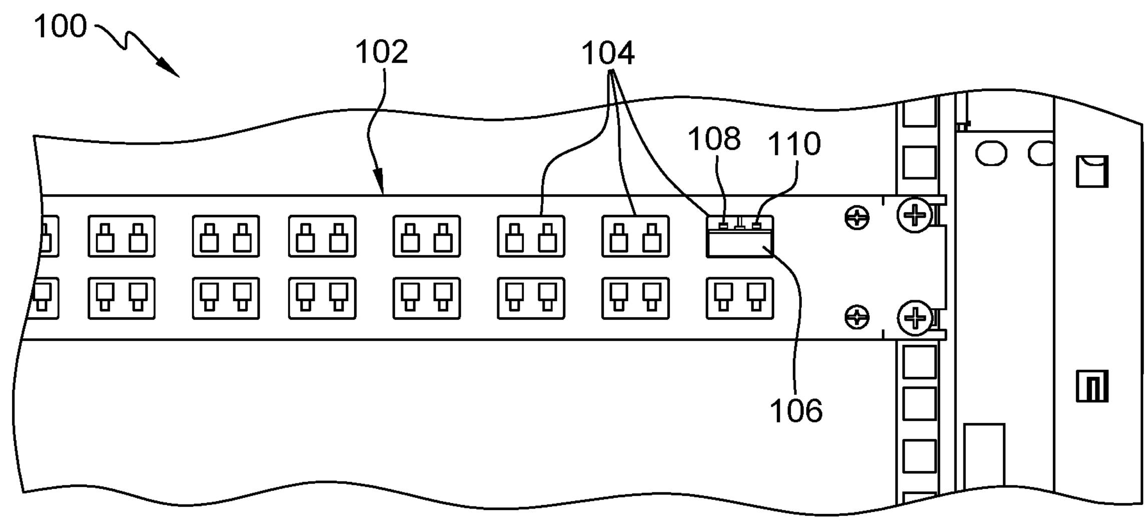
FIG. 1A depicts a front view of an adjustable attenuation wrap plug installed on an end product, in accordance with an embodiment of the present invention.

Embodiments of the present invention provide an adjustable attenuation wrap plug for simulating different lengths of fiber optic signal cable connections and isolating issues at an end product at a customer site. One embodiment for an adjustable attenuation wrap plug includes a housing with a protruding input prong and output prong, where a signal cable is encased by the housing. A first end of the signal cable is connected to the input prong and a second end of the signal cable is connected to the output prong. The adjustable attenuation wrap plug includes a ratchet mechanism coupled to the housing, where the ratchet mechanism is configurable to alter a shape of the signal cable encased in the housing. Another embodiment for an adjustable attenuation wrap plug includes a housing with a protruding input prong and output prong at a first end, where a signal cable is encased by the housing. A first end of the signal cable is connected to the input prong and a second end of the signal cable is connected to the output prong. The adjustable attenuation wrap plug includes a cavity at a second end of the housing, where an attenuation adjustment block is insertable into the cavity and configured to alter a shape of the signal cable. Altering the shape (i.e., deformation) of the signal cable changes an attenuation level for the adjustable attenuation wrap plug.

Detailed embodiments of the present invention are disclosed herein with reference to the accompanying drawings; however, it is to be understood that the disclosed embodiments are merely illustrative of potential embodiments of the invention and may take various forms. In addition, each of the examples given in connection with the various embodiments is also intended to be illustrative, and not restrictive. This description is intended to be interpreted merely as a representative basis for teaching one skilled in the art to variously employ the various aspects of the present disclosure. In the description, details of well-known features and techniques may be omitted to avoid unnecessarily obscuring the presented embodiments.

For purposes of the description hereinafter, terms such as "upper", "lower", "right", "left", "vertical", "horizontal", "top", "bottom", and derivatives thereof shall relate to the disclosed structures and methods, as oriented in the drawing figures. Terms such as "above", "overlying", "atop", "on top", "positioned on" or "positioned atop" mean that a first element, such as a first structure or first member, is present on a second element, such as a second structure or second member, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements. The term substantially, or substantially similar, refer to instances in which the difference in length, height, or orientation convey no practical difference between the definite recitation (e.g. the phrase sans the substantially similar term), and the substantially similar variations. In one embodiment, substantial (and its derivatives) denote a difference by a generally accepted engineering or manufacturing tolerance for similar devices, up to, for example, 10% deviation in value or 10° deviation in angle.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

FIG. 1A depicts a front view of an adjustable attenuation wrap plug installed on an end product, in accordance with an embodiment of the present invention. End product 100 represents server equipment with optical port panel 102 that includes multiple optical ports 104 with multiple input 108 and output 110 pairs. Adjustable attenuation wrap plug 106 is inserted (i.e., plugged) into a single optical port 104 with a single input 108 and output 110 pair, where a loopback test is being performed on the single optical port 104. Adjustable attenuation wrap plug 106 is configured to route data transmitted from output 110 back to input 108 as received data, thus simulating a complete communication link (i.e. loop back). Adjustable attenuation wrap plug 106 is configurable to various attenuations to simulate signals requiring a desired distance of travel. Adjustable attenuation wrap plug 106 is discussed in further detail with regards to FIG. 2A.

Figure 1B:
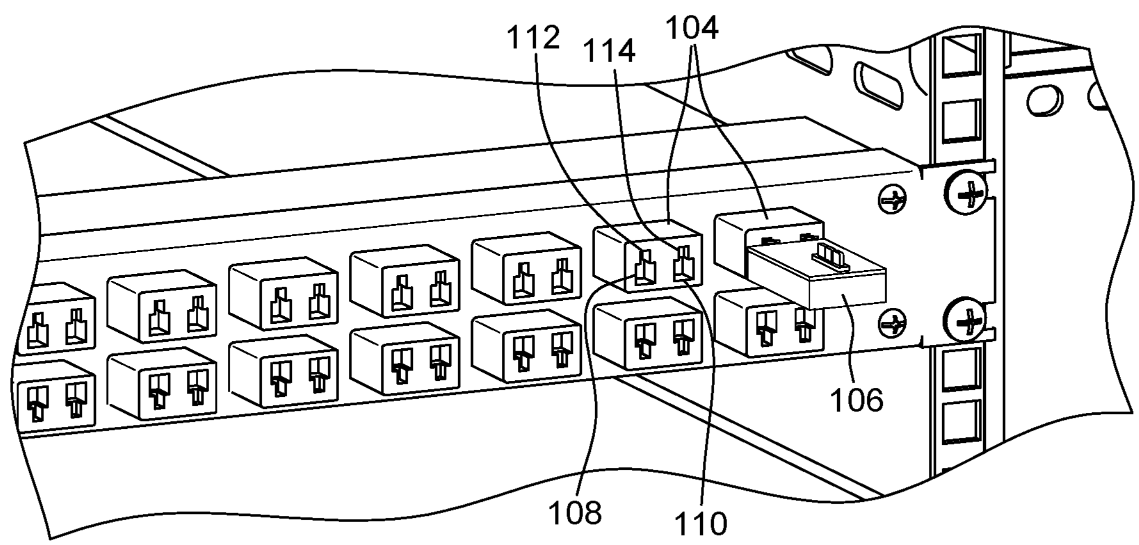
FIG. 1B depicts a 3-dimensional view of an adjustable attenuation wrap plug installed on an end product, in accordance with an embodiment of the present invention.

FIG. 1B depicts a 3-dimensional view of an adjustable attenuation wrap plug installed on an end product, in accordance with an embodiment of the present invention. Dimensions of adjustable attenuation wrap plug 106 are such that multiple adjustable attenuation wrap plugs 106 can be inserted into respective optical ports 104 without interfering with one another. A technician has the ability to set an attenuation level on adjustable attenuation wrap plug 106 and insert adjustable attenuation wrap plug into optical port 104. If the attenuation level needs to be adjusted, the technician can remove adjustable attenuation wrap plug 106, adjust the attenuation level, and re-insert adjustable attenuation wrap plug 106 back into optical port 104. Alternatively, the technician has the ability to adjust the attenuation level, where adjustable attenuation wrap plug 106 remains inserted into optical port 104. In this embodiment, adjustable attenuation wrap plug 106 is insertable into optical port 104 in a single orientation, where protruding compressible clips of adjustable attenuation wrap plug 106 align with corresponding input clip cavity 112 at input 108 and output clip cavity 114 at output 110. In other embodiment, adjustable attenuation wrap plug 106 does not have protruding compressible clips, allowing for adjustable attenuation wrap plug 106 to be inserted in two orientations.

Figure 2A:
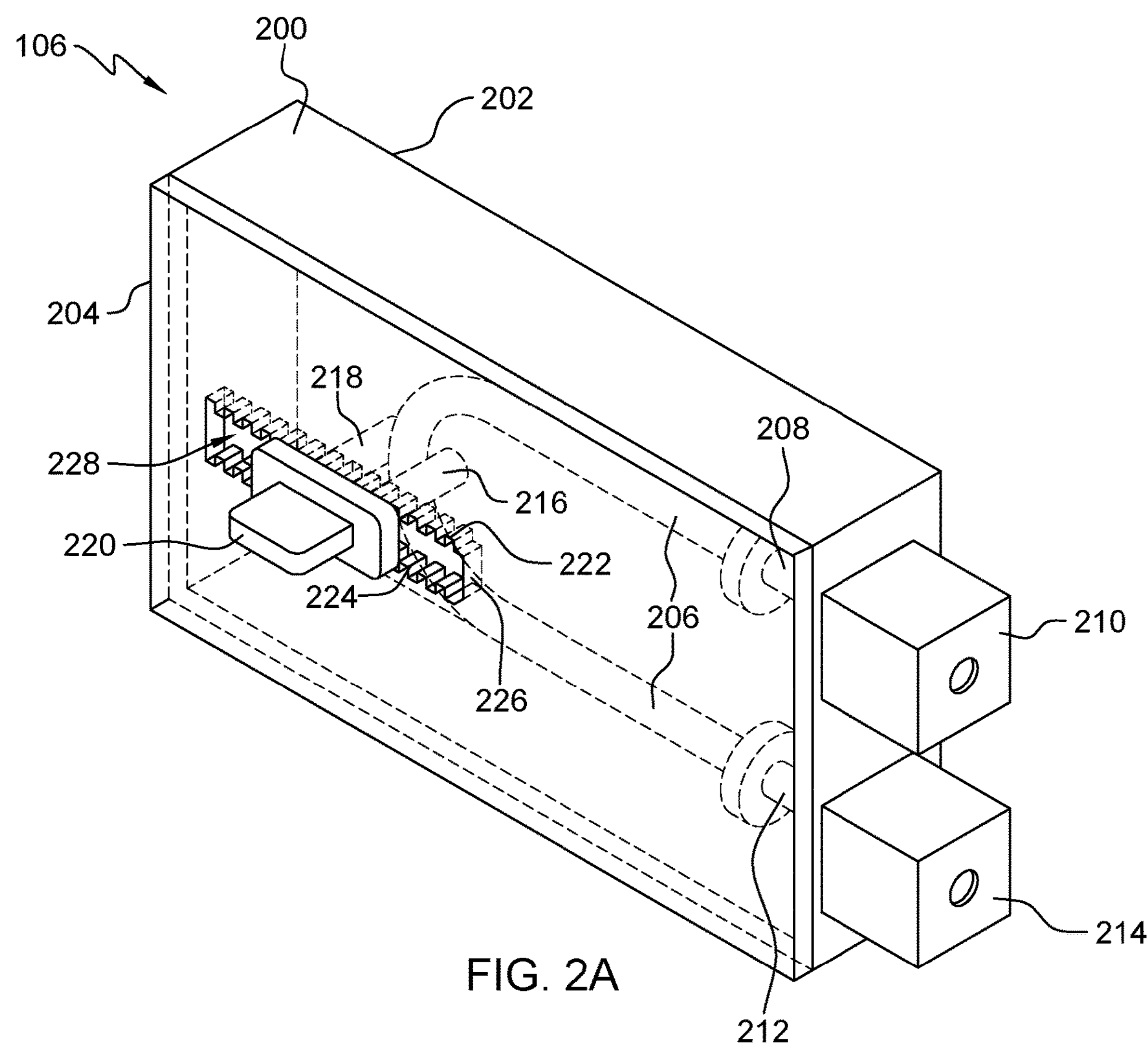
FIG. 2A depicts a transparent 3-dimensional view of an adjustable attenuation wrap plug in an undeformed state, in accordance with an embodiment of the present invention.

FIG. 2A depicts a transparent 3-dimensional view of an adjustable attenuation wrap plug in an undeformed state, in accordance with an embodiment of the present invention. Adjustable attenuation wrap plug 106 includes housing 200 which consists of bottom portion 202 and top portion 204, wherein bottom portion 202 and top portion 204 form a cavity that encases optical fiber 206 (i.e., signal cable). First end 208 of optical fiber 206 is electrically connected to input prong 210 for electrically coupling to input 108 of optical port 104 (previously discussed with regards to FIG. 1A). Second end 212 of optical fiber 206 is electrically connected to input prong 214 for electrically coupling to output 110 of optical port 104 (previously discussed with regards to FIG. 1A). An apex of optical fiber 206 is disposed between inner apex member 216 and outer apex member 218, where inner apex member 216 and outer apex member 218 protrude from attenuation adjustment pawl 220. Attenuation adjustment pawl 220 engages with a linear gear path to create a ratchet mechanism that includes upper linear path 222 and lower linear path 224, where first end stop 226 and second end stop 228 define the bounds of the linear gear path with which attenuation adjustment pawls 220 engages to form the ratchet mechanism. In some embodiments, attenuation adjustment pawl 220 includes a dust shield, where the dust shield covers an aperture defined by upper linear path 222, lower linear path 224, first end stop 226, and second end stop 228. The dust shield covers an aperture into a cavity defined by bottom portion 202 and top portion 204 of adjustable attenuation wrap plug 106, where dimensions of the dust shield are such that the aperture is covered at every position of attenuation adjustment pawl 220 along the linear gear path. The dust shield further prevents contaminant from contacting optical fiber 206 and negatively impacting test results.

Figure 2B:
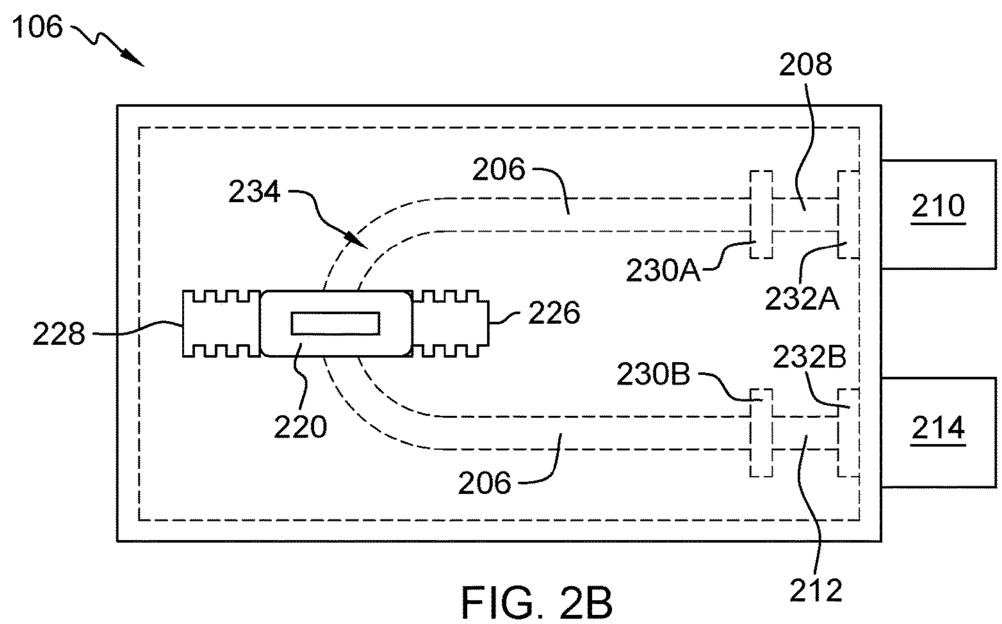
FIG. 2B depicts a transparent top view of an adjustable attenuation wrap plug in an undeformed state, in accordance with an embodiment of the present invention.

FIG. 2B depicts a transparent top view of an adjustable attenuation wrap plug in an undeformed state, in accordance with an embodiment of the present invention. Optical fiber 206 includes first ring 230A and second ring 232A at first end 208, along with first ring 230B and second ring 232B at second end 212 to prevent deformation near input prong 210 and output prong 214, respectively. First end 208 and second end 212 include a rigid overlay sleeve between first ring 230A and second ring 232A, along with first ring 230B and second ring 232B, respectively. In the undeformed state, undeformed bend radius 234 represents a radius at which optical fiber 206 would experience the least amount of attenuation when a signal is passed through output prong 214 and input prong 210. Attenuation adjustment pawl 220 is positioned between first end stop 226 and second end stop 228 along the linear gear path. Moving attenuation adjustment pawl 220 towards second end stop 228 results in optical fiber 206 being pulled and deformed (discussed in further detail with regards to FIGS. 3A and 3B). Moving attenuation adjustment pawl 220 towards first end stop 226 results in optical fiber 206 being pushed and deformed, introducing two additional bend radii (discussed in further detail with regards to FIGS. 4A and 4B).

Figure 2C:
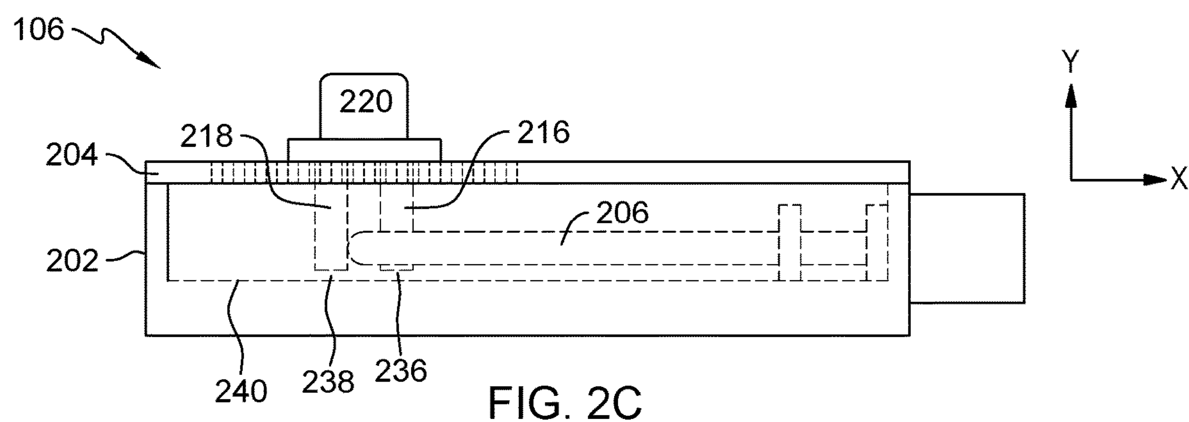
FIG. 2C depicts a transparent side view of an adjustable attenuation wrap plug in an undeformed state, in accordance with an embodiment of the present invention.

FIG. 2C depicts a transparent side view of an adjustable attenuation wrap plug in an undeformed state, in accordance with an embodiment of the present invention. Attenuation adjustment pawl 220 includes a member extending beyond a planar surface of top portion 204, where a force applied to the member in the x-axis direction results in attenuation adjustment pawl 220 moving along the linear gear path. As previous discussed, an apex of optical fiber 206 is disposed between inner apex member 216 and outer apex member 218, where a movement of attenuation adjustment pawl 220 results in optical fiber 206 being pulled in the −x-axis direction or pushed in the +x-axis direction. Inner apex member 216 protrudes from attenuation adjustment pawl 220, where a height of cavity 236 between a first end of inner apex member 216 and inner surface 240 of bottom portion 202 is less than a diameter of optical fiber 206. As a result, inner apex member 216 can pull optical fiber 206 at the apex without optical fiber 206 passing through cavity 236. Similarly, outer apex member 218 protrudes from attenuation adjustment pawl 220, where a height of cavity 238 between a first end of outer apex member 218 and inner surface 240 of bottom portion 202 is less than a diameter of optical fiber 206. As a result, outer apex member 218 can push against optical fiber 206 at the apex without optical fiber 206 passing through cavity 238. In other embodiments, a first end of inner apex member 216 and a first end of outer apex member 218 contact inner surface 240 of bottom portion 202, where inner surface 240 includes a guide (e.g., cavity) in which the first end of inner apex member 216 and the first end of outer apex member 218 are disposed. The guide would at least partially align with the linear gear path utilized by attenuation adjustment pawl 220.

Figure 3A:
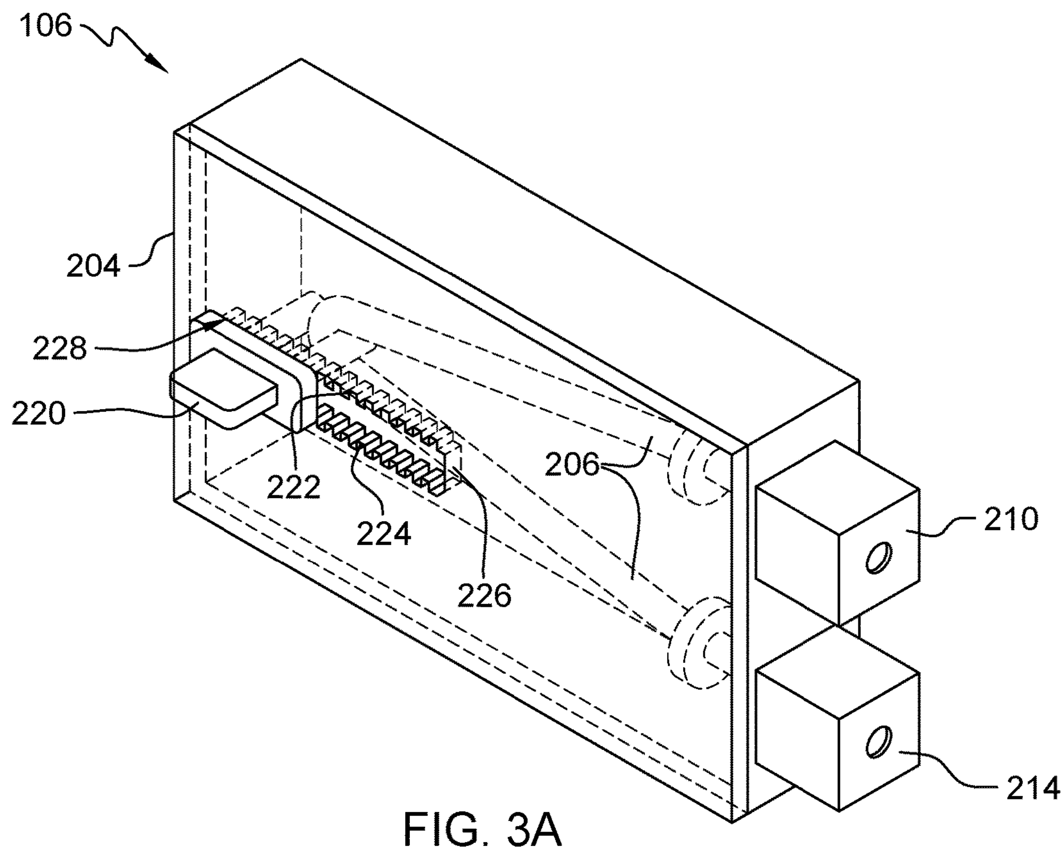
FIG. 3A depicts a transparent 3-dimensional view of an adjustable attenuation wrap plug in a partially deformed state, in accordance with an embodiment of the present invention.

FIG. 3A depicts a transparent 3-dimensional view of an adjustable attenuation wrap plug in a partially deformed state, in accordance with an embodiment of the present invention. In this embodiment, adjustable attenuation wrap plug 106 is in a partially deformed state, where attenuation adjustment pawl 220 is pulling on optical fiber 206. As a result, a signal sent between output prong 214 and input prong 210 through optical fiber 206 would experience an increased amount of attenuation compared to the undeformed state, previously discussed in FIGS. 2A-2C. The increased amount of attenuation of adjustable attenuation wrap plug 106 allows for a user to test the product simulating a longer fiber optic connection compared to the undeformed state.

As previously discussed, attenuation adjustment pawl 220 engages with a linear gear path to create a ratchet mechanism that includes upper linear path 222 and lower linear path 224, where first end stop 226 and second end stop 228 define the bounds of the linear gear path with which attenuation adjustment pawls 220 engages to form the ratchet mechanism. In this embodiment, attenuation adjustment pawl 220 is positioned at second end stop 228, where attenuation adjustment pawl 220 locks into position by engaging with the multiple teeth elements of upper linear path 222 and lower linear path 224. Attenuation adjustment pawl 220 can disengage with the multiple teeth elements of upper linear path 222 and lower linear path 224 by applying a force to the protruding member of attenuation adjustment pawl 220 in a direction similar to the linear gear path, where the force allows for a spring mechanism to disengage with the multiple teeth elements. Attenuation adjustment pawl 220 can be positioned at any ratchet point (i.e., between two teeth elements) along the linear gear path, where each position provides a different attenuation level for adjustable attenuation wrap plug 106. The ratchet points are defined by a configuration of upper linear path 222 and lower linear path 224 that includes a length of the linear gear path and a number of teeth elements.

Figure 3B:
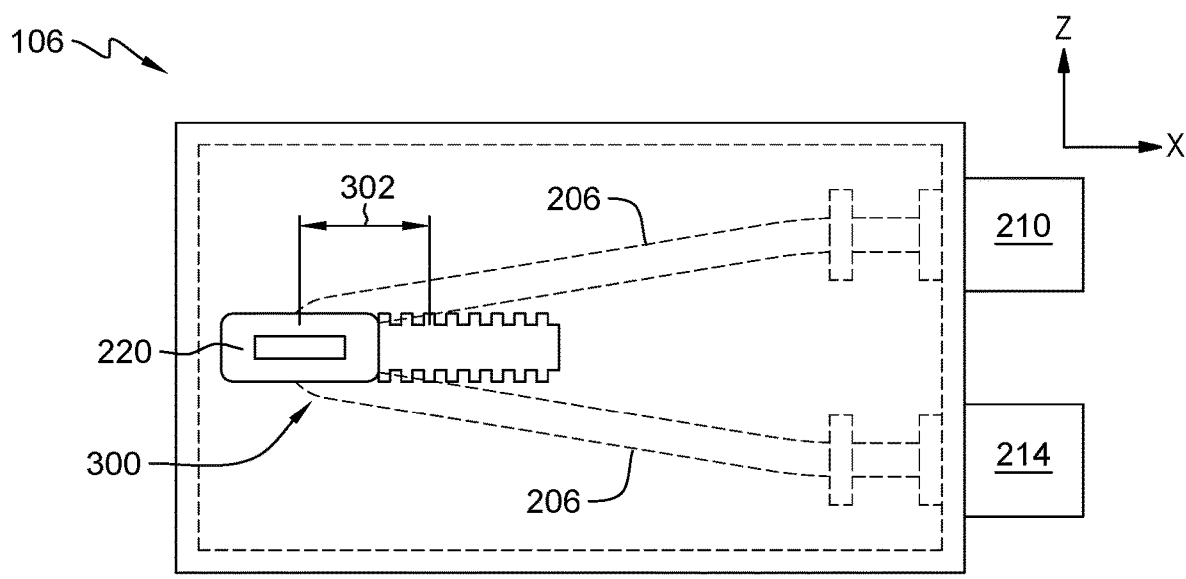
FIG. 3B depicts a transparent top view of an adjustable attenuation wrap plug in a partially deformed state, in accordance with an embodiment of the present invention.

FIG. 3B depicts a transparent top view of an adjustable attenuation wrap plug in a partially deformed state, in accordance with an embodiment of the present invention. In the partially deformed state, partially deformed bend radius 300 represents a radius at which optical fiber 206 would experience an increased amount attenuation when a signal is passed through output prong 214 and input prong 210 relative to the undeformed state, previously discussed with regards to FIGS. 2A-2C. Attenuation adjustment pawl 220 was moved in the −x-axis direction, thus pulling optical fiber 206 and decreasing bend radius at the apex of optical fiber 206 until partially deformed bend radius 300 was reached. Distance 302 represents a measured change in position of attenuation adjustment pawl 220 between the undeformed state and the partially deformed state.

Figure 4A:
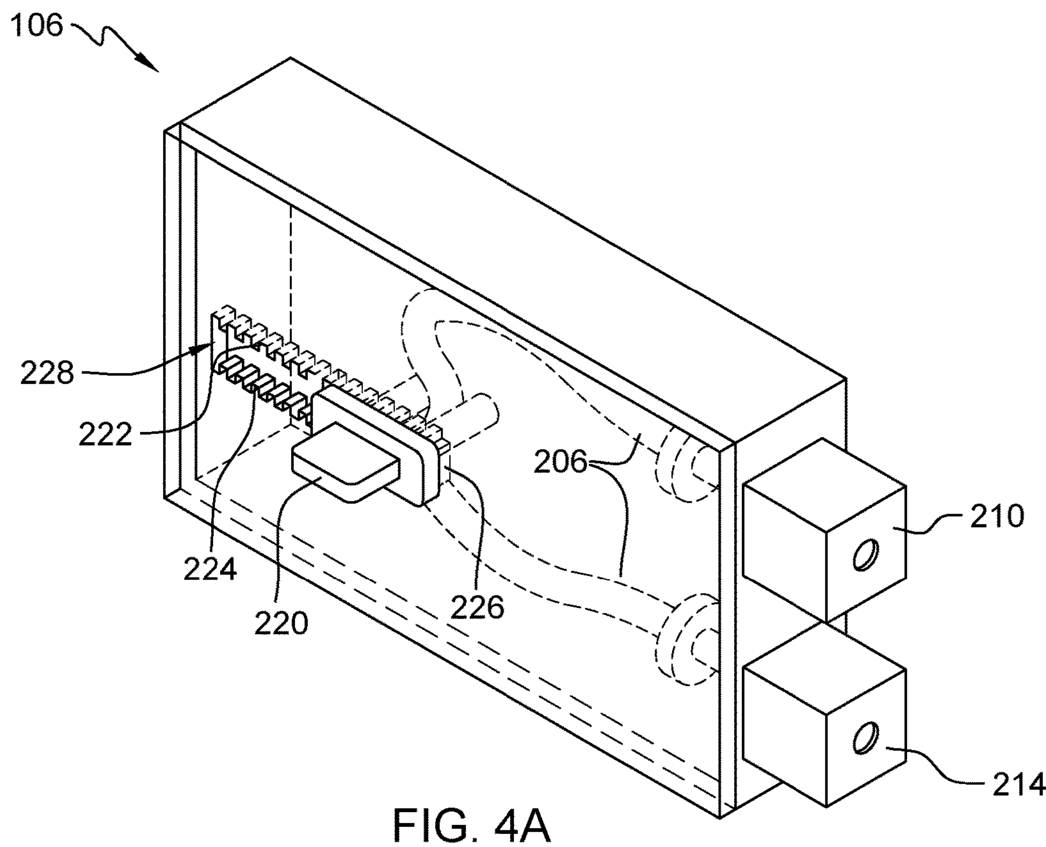
FIG. 4A depicts a transparent 3-dimensional view of an adjustable attenuation wrap plug in a fully deformed state for maximum attenuation, in accordance with an embodiment of the present invention.

FIG. 4A depicts a transparent 3-dimensional view of an adjustable attenuation wrap plug in a fully deformed state for maximum attenuation, in accordance with an embodiment of the present invention. In this embodiment, adjustable attenuation wrap plug 106 is in a fully deformed state, where attenuation adjustment pawl 220 is pushing on optical fiber 206. As a result, a signal sent between output prong 214 and input prong 210 through optical fiber 206 would experience a maximum amount of attenuation compared to the undeformed state and the partially deformed, previously discussed in FIGS. 2A-2C and 3A-3B. The maximum amount of attenuation of adjustable attenuation wrap plug 106 allows for a user to test the product simulating a longer fiber optic connection compared to the undeformed state and the partially deformed state. As previously discussed, attenuation adjustment pawl 220 engages with a linear gear path to create a ratchet mechanism that includes upper linear path 222 and lower linear path 224, where first end stop 226 and second end stop 228 define the bounds of the linear gear path with which attenuation adjustment pawls 220 engages to form the ratchet mechanism. In this embodiment, attenuation adjustment pawl 220 is positioned at first end stop 226, where attenuation adjustment pawl 220 locks into position by engaging with the multiple teeth elements of upper linear path 222 and lower linear path 224. Attenuation adjustment pawl 220 can disengage with the multiple teeth elements of upper linear path 222 and lower linear path 224 by applying a force to the protruding member of attenuation adjustment pawl 220 in a direction similar to the linear gear path, where the force allows for a spring mechanism to disengage with the multiple teeth elements.

Figure 4B:
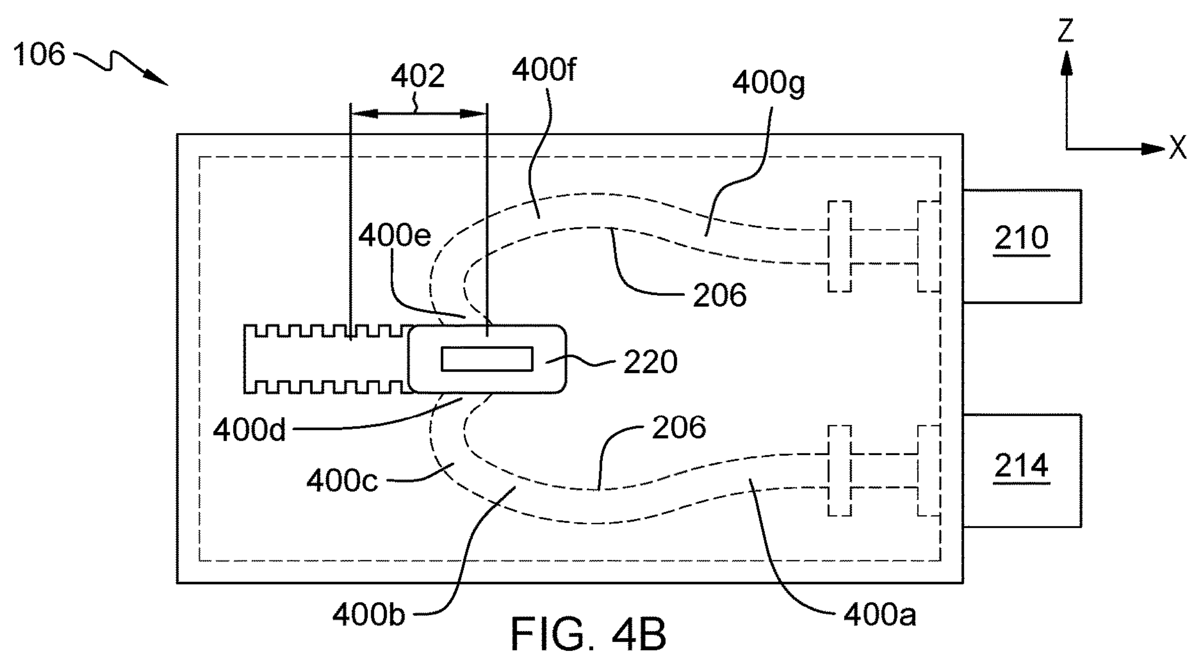
FIG. 4B depicts a transparent top view of an adjustable attenuation wrap plug in a fully deformed state for maximum attenuation, in accordance with an embodiment of the present invention.

FIG. 4B depicts a transparent top view of an adjustable attenuation wrap plug in a fully deformed state for maximum attenuation, in accordance with an embodiment of the present invention. In the fully deformed state, deformed bend radii 400*a*, 400*b*, 400*c*, 400*d*, 400*e*, 400*f*, and 400*g* represents multiple radii at which optical fiber 206 would experience an increased amount attenuation when a signal is passed through output prong 214 and input prong 210 relative to the undeformed state and partially deformed state, previously discussed with regards to FIGS. 2A-2C and 3A-3B. Attenuation adjustment pawl 220 was moved in the x-axis direction, thus pushing optical fiber 206 and creating multiple bend radii along optical fiber 206 until deformed bend radii 400*a*, 400*b*, 400*c*, 400*d*, 400*e*, 400*f*, and 400*g* were reached. Distance 402 represents a measured change in position of attenuation adjustment pawl 220 between the undeformed state and the fully deformed state.

Figure 5A:
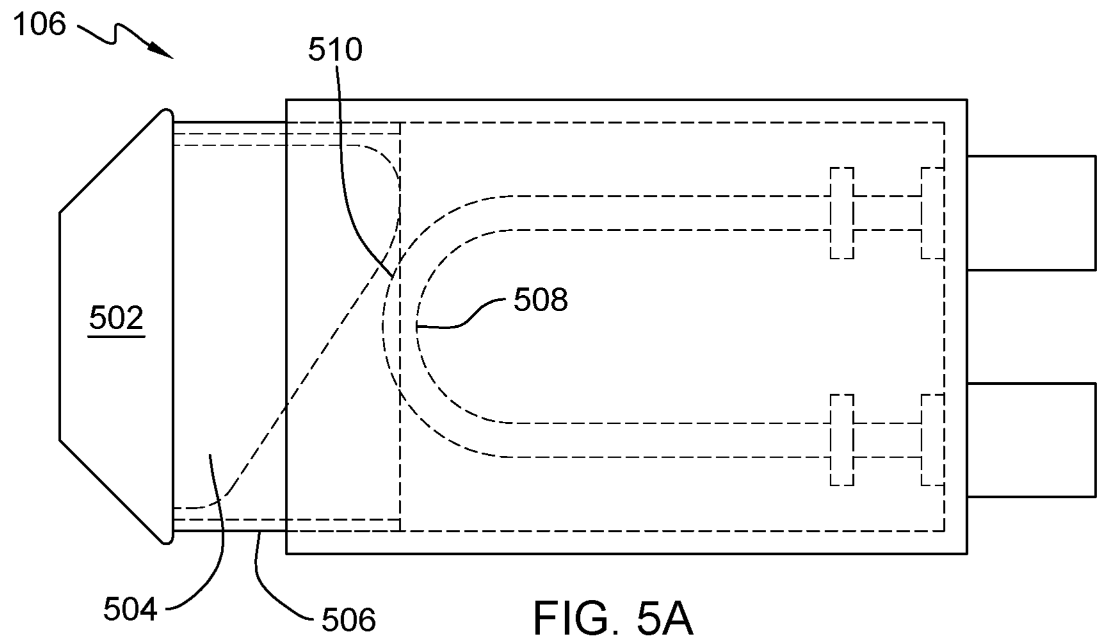
FIG. 5A depicts a transparent top view of an adjustable attenuation wrap plug in an undeformed state with an insertable attenuation adjustment block, in accordance with an embodiment of the present invention.

FIG. 5A depicts a transparent top view of an adjustable attenuation wrap plug in an undeformed state with an insertable attenuation adjustment block, in accordance with an embodiment of the present invention. In this embodiment, adjustable attenuation wrap plug 106 includes body 500 and adjustment block 502, where adjustment block 502 is insertable into an aperture of body 500. Adjustment block

502 includes press shape 504 partially encased in enclosure 506, where enclosure 506 is insertable into a first end of body 500 of adjustable attenuation wrap plug 106. Enclosure 506 ensures that optical fiber 206 contacts press shape 504 of adjustment block 502 and ensures a seal is created at the first end of body 500 to prevent containments from entering the cavity of body 500 with optical fiber 206 and potentially damaging optical fiber 206. A shape and dimensions of press shape 504 is dependent on a desire shape and bend radius of optical fiber 206 in body 500. As adjustment block 502 is inserted into body 500, press shape 504 contacts optical fiber 206 with undeformed bend radius 508 at point 510 (i.e., undeformed state of adjustable attenuation wrap plug 106) and optical fiber 206 begins to deform according to the shape and dimensions of press shape 504.

Figure 5B:
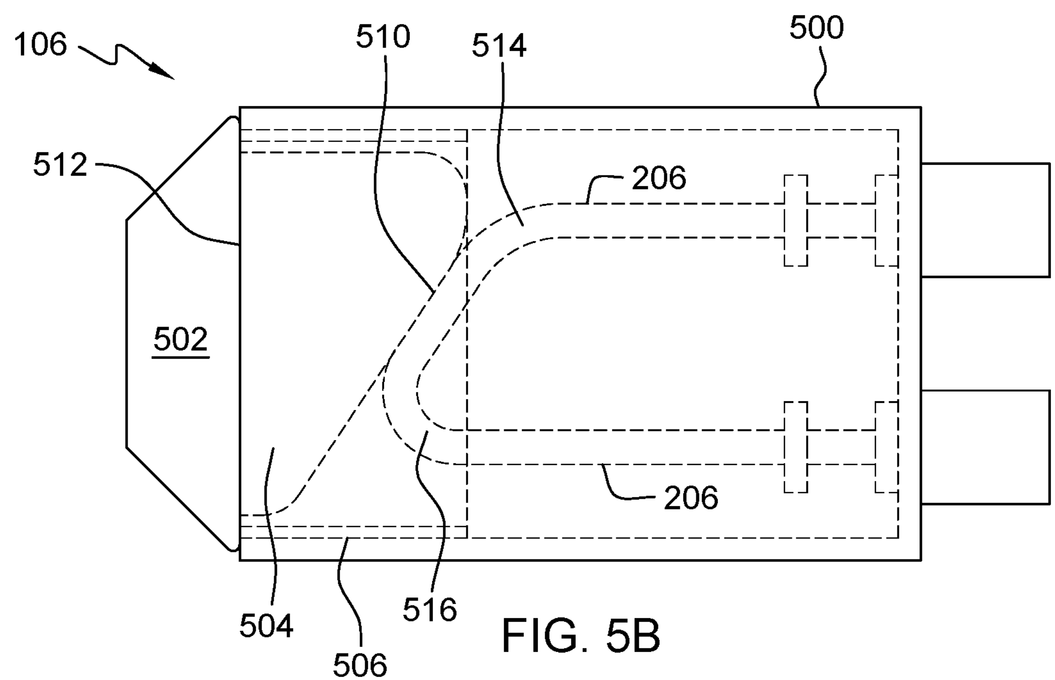
FIG. 5B depicts a transparent top view of an adjustable attenuation wrap plug in a deformed state with an inserted attenuation adjustment block, in accordance with an embodiment of the present invention.

FIG. 5B depicts a transparent top view of an adjustable attenuation wrap plug in a deformed state with an inserted attenuation adjustment block, in accordance with an embodiment of the present invention. Adjustment block 502 is inserted into body 500 until a seal is created at the first end of body 500 at edge 512, where edge 512 is defined as a perimeter of a cavity of body 500 into which adjustment block 502 is inserted. As previously discussed, point 510 represented an initial contact location between press shape 504 and optical fiber 206, where adjustment block 502 is inserted into body 500 and optical fiber 206 deforms according to the shape and dimensions of press shape 504. The deformed state of adjustable attenuation wrap plug 106 includes multiple deformed bend radii 514 and 516. In another embodiment, press shape 504 of adjustment block 502 is such that optical fiber 206 initially contacts press shape 504 at multiple points, resulting in multiple bend radii along optical fiber 206 for maximum attenuation. It is to be noted that the insertable adjustment block 502 of adjustable attenuation wrap plug 106 in FIGS. 5A and 5B can be combined with the embodiments discussed in FIGS. 2A-2C, 3A-3B, and 4A-4B, which includes attenuation adjustment pawl 220.

The terminology used herein is for the purpose of describing particular embodiments only and is not intended to be limiting to the invention. As used herein, the singular forms "a", "an" and "the" are intended to include the plural forms as well, unless the context clearly indicates otherwise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable other of ordinary skill in the art to understand the embodiments disclosed herein. It is therefore intended that the present invention not be limited to the exact forms and details described and illustrated but fall within the scope of the appended claims.

What is claimed is:

1. An apparatus for an adjustable attenuation wrap plug, the apparatus comprising:

a housing with a protruding input prong and output prong, wherein a signal cable is coupled to the input prong and the output prong;

a ratchet mechanism at least partially disposed in the housing, wherein the ratchet mechanism is configurable to alter a shape of the signal cable; and an attenuation adjustment pawl of the ratchet mechanism includes an inner apex member and an outer apex member, wherein a portion of the signal cable is disposed between the inner apex member and the outer apex member.

2. The apparatus of claim 1, wherein altering the shape of the signal cable alters an attenuation level.

3. The apparatus of claim 1, wherein the signal cable is a fiber optic cable.

4. The apparatus of claim 3, wherein the input prong and the output prong are each insertable into an optical port on an end product.

5. The apparatus of claim 1, wherein the ratchet mechanism comprises a linear gear path for the attenuation adjustment pawl.

6. The apparatus of claim 1, wherein the inner apex member of the attenuation adjustment pawl is configured to pull the signal cable disposed in the housing.

7. The apparatus of claim 6, wherein pulling the signal cable alters a bend radius of the signal cable.

8. The apparatus of claim 7, further comprising:

a cavity between a first end of the inner apex member and an inner surface of the housing, wherein a height of the cavity is less than a diameter of the signal cable.

9. The apparatus of claim 1, wherein the outer apex member of the attenuation adjustment pawl is configured to push the signal cable disposed in the housing.

10. The apparatus of claim 9, wherein pushing the signal cable introduces at least one bend radius into the signal cable.

11. The apparatus of claim 10, further comprising:

a cavity between a first end of the outer apex member and an inner surface of the housing, wherein a height of the cavity is less than a diameter of the signal cable.

12. The apparatus of claim 1, wherein the inner apex member of the attenuation adjustment pawl is configured to pull the signal cable disposed in the housing and the outer apex member of the attenuation adjustment pawl is configured to push the signal cable disposed in the housing.

13. The apparatus of claim 12, wherein pulling the signal cable reduces a bend radius of the signal cable and pushing the signal cable introduces at least one bend radius into the signal cable.

14. The apparatus of claim 13, further comprising:

a first cavity between a first end of the inner apex member and an inner surface of the housing, wherein a height of the first cavity is less than a diameter of the signal cable; and a second cavity between a first end of the outer apex member and the inner surface of the housing, wherein a height of the second cavity is less than the diameter of the signal cable.

* * * * *